Patented Jan. 8, 1935

1,987,171

UNITED STATES PATENT OFFICE 1,987,171

PRODUCTION OF CONVERSION PRODUCTS OF CAOUTCHOUC

Erwin Walz, Ludwigshafen-on-the-Rhine, Germany, assignor to I. G. Farbenindustrie Aktiengesellschaft, Frankfort-on-the-Main, Germany No Drawing. Application February 28, 1930, Serial No. 432,271. In Germany March 11, 1929

10 Claims. (Cl. 260—1)

The present invention relates to the production of conversion products of caoutchouc.

I have found that valuable conversion products, displaying thermoplastic properties, are obtained from caoutchouc when the latter is treated with phosphorus oxyhalides or mixtures of these with phosphorus halides, preferably in the presence of an inert organic solvent at least swelling, or dissolving, caoutchouc.

The conversion can be effected for example by employing as initial material a solution of caoutchouc in an organic solvent inert to phosphorus halides, such as benzene, benzine, halogenated hydrocarbons, ethyl ether or the like, or the process may suitably be carried out by treating caoutchouc, which has been caused to swell by means of benzene or the like, with phosphorus oxychloride, together, if desired, with a phosphorus halide or another substance decomposing caoutchouc, whereupon liquefaction of the swollen mass ensues, or the caoutchouc is introduced into a benzol solution of phosphorus oxychloride, in which it dissolves after a short time. The thin solution containing the themoplastic product is then freed from the solvent, as far as possible, by distillation in vacuo, and the remainders of solvent can be removed, if desired, by moderate heating, such as up to from about 50° to 60° C. In any case no chemical alteration of the caoutchouc occurs, but only a kind of depolymerization and thermoplastic non-sticky products are obtained, which are practically free from halogen.

The solutions of the conversion product in benzene, benzine, chloroform or carbon tetrachloride and the like are suitable for the production of transparent, waterproof films, ribbons, sheets and the like, the properties of which can be easily modified, for example by an addition of one or more plasticizing agents, by which means new and diversified products, for example such as exhibit the character of guttapercha, are obtained.

The following examples will further illustrate the nature of this invention, but the invention is not restricted to these examples. The parts are by weight.

*Example 1*

100 parts of caoutchouc swollen with the aid of 1000 parts of benzene are treated with from 7 to 10 parts of phosphorus oxychloride, the mixture being kept at 40° C. until liquefaction occurs. The solvent is then evaporated in vacuo, and the residue constitutes a thermoplastic product, which can be freed from remainders of solvent very quickly by heating it at from 70° to 80° C. for about 30 minutes. The preferred method of eliminating the phosphorus oxychloride from the reaction product is by washing with water or dilute aqueous ammonia on a heated roller mill. The softening point of the conversion product, when practically free from phosphorus, is at about 100° C. to 110° C. In thicker layers the product is hard and brittle at room temperature.

*Example 2*

100 parts of caoutchouc swollen with the aid of 1000 parts of benzene are treated with from 7 to 10 parts of phosphorus oxychloride, the mixture being kept at 40° C. until liquefaction occurs. The thin solution of reddish brown shade obtained is then treated with gaseous ammonia until its colour has changed to pale yellow and poured out, in the form of a thin layer, on a glass plate, and, after the main portion of the solvent has been evaporated at room temperature, the dried film is warmed at about 100° C. for from 5 to 10 minutes. A soft, transparent, non-adhesive film, which is impervious to water and can be folded without breaking, can be stripped from the plates.

The properties of these films and sheets can be easily modified. For example, by the addition of graduated quantities of plasticizing or softening agents a hard and brittle film can be rendered soft, supple, or slightly elastic.

*Example 3*

The product obtained according to Example 1 is purified by washing, as described, and then dissolved in carbon tetrachloride or chloroform and incorporated with a softening agent, such as camphor, or the softening agents known in the trade under the trade marks Mollit, Plastol, Mannol or methyl-adipic methyl-cyclohexyl ester, whereupon films or sheets are prepared in the manner described in Example 2. By the addition of 5 per cent of camphor or of 3 per cent of "Mollit" or 7 per cent of "Mannol" sheets or films are obtained, which are soft at room temperature, pliable and slightly resilient and in their properties resemble guttapercha to some degree.

*Example 4*

A homogeneous solution of 100 parts of caoutchouc in 1000 parts of benzene is incorporated with a solution of 5 parts of phosphorus oxybromide and 2 parts of phosphorus oxychloride in 100 parts of benzene, the mixture being then kept at room temperature for 24 hours. A thinly liquid brown red soltuion of the thermoplastic conversion product is obtained, which is then treated with gaseous ammonia until its shade has changed to pale yellow. The solvent is then evaporated in vacuo, and the residue is washed on the rollers with warm water of 50° C. until it is free from electrolyte.

What I claim is:—

1. A process for the production of thermoplastic products from caoutchouc which comprises heating rubber with phosphorus oxychloride in the presence of benzene at about 40° C. until liquefaction occurs, and removing the solvent from the resulting solution.

2. The process as defined in claim 1 wherein the solvent free product is dried by heating to a temperature ranging from 70 to 80° C.

3. A process for the production of thermoplastic products from caoutchouc which comprises forming a homogeneous solution of caoutchouc in benzene, incorporating in the solution phosphorus oxybromide and phosphorus oxychloride, maintaining the mixture at room temperature until a thin liquid brownish red solution is obtained, treating the solution with ammonia until its color changes to a pale yellow, and removing the benzene from the solution by heating in a vacuo.

4. The process for the production of thermoplastic products from caoutchouc which comprises converting caoutchouc by adding thereto a phosphorus oxyhalide in the presence of an inert organic liquid capable of swelling caoutchouc.

5. The process for the production of thermoplastic products from caoutchouc which comprises converting caoutchouc by adding thereto a phosphorus oxyhalide in the presence of an inert organic liquid capable of dissolving caoutchouc.

6. The process for the production of thermoplastic products from caoutchouc which comprises converting caoutchouc by adding thereto a phosphorus oxyhalide and a phosphorus halide in the presence of an inert organic liquid capable of swelling caoutchouc.

7. The process for the production of thermoplastic products from caoutchouc which comprises converting caoutchouc, swollen with benzene, by adding thereto phosphorus oxychloride, until liquefaction occurs, drying the solution obtained and washing the product.

8. The process for the production of thermoplastic products from caoutchouc which comprises converting caoutchouc by adding thereto a phosphorus oxyhalide in the presence of an inert organic liquid capable of swelling caoutchouc and warming the product after removing the liquid.

9. The process for the production of thermoplastic products from caoutchouc which comprises converting caoutchouc by adding thereto a phosphorus oxyhalide in the presence of an inert organic solvent capable of dissolving caoutchouc, spraying the solution obtained on a base, removing the solvent and washing the film obtained.

10. A transparent, hard, thermo-plastic, non sticky conversion product of caoutchouc free from halogen and sulphur, substantially identical with the product of the process defined in claim 4.

ERWIN WALZ.